L. CLARK.
MACHINE FOR HARVESTING GRAIN.
APPLICATION FILED MAR. 19, 1917. RENEWED JULY 1, 1918.

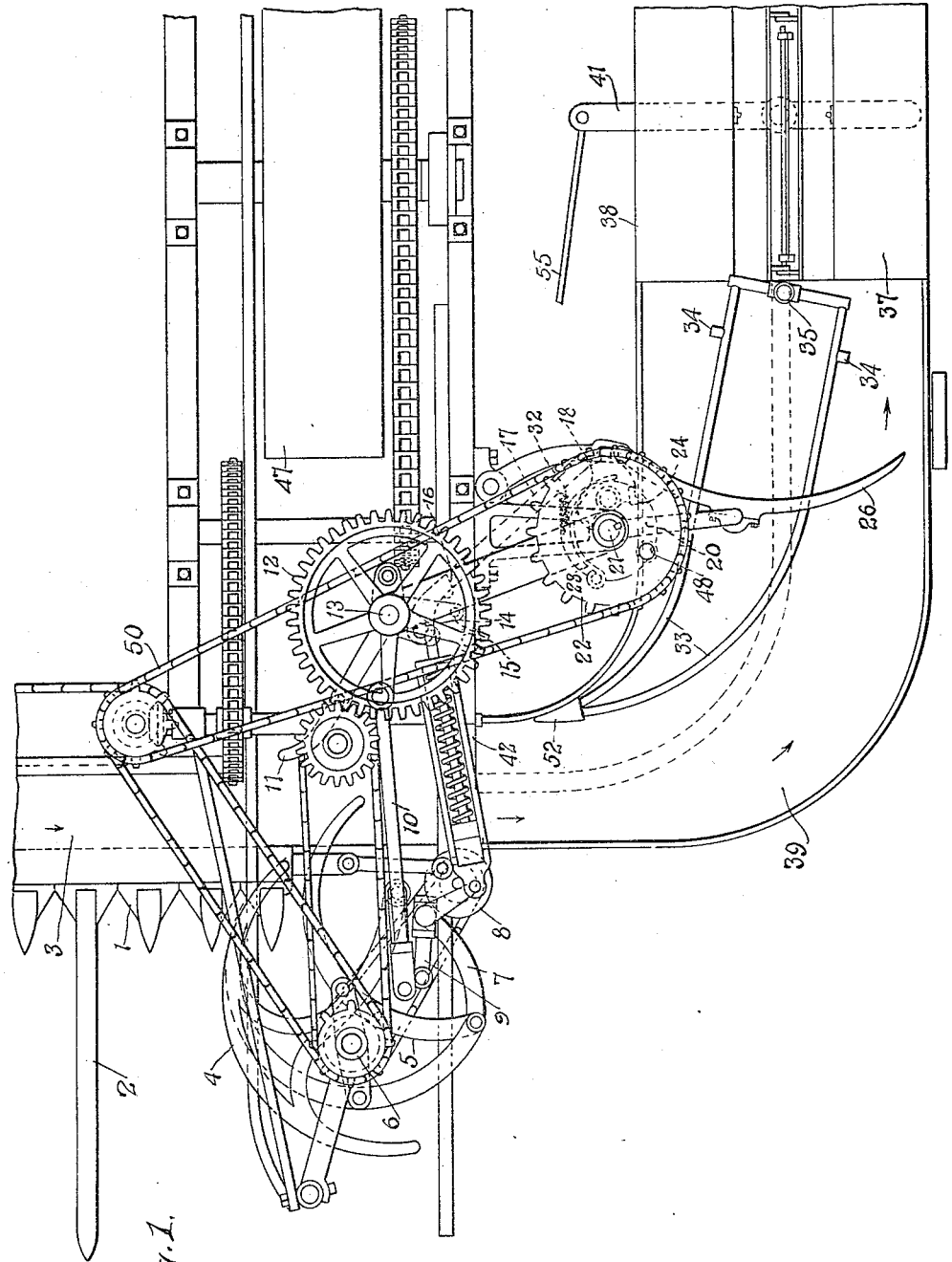

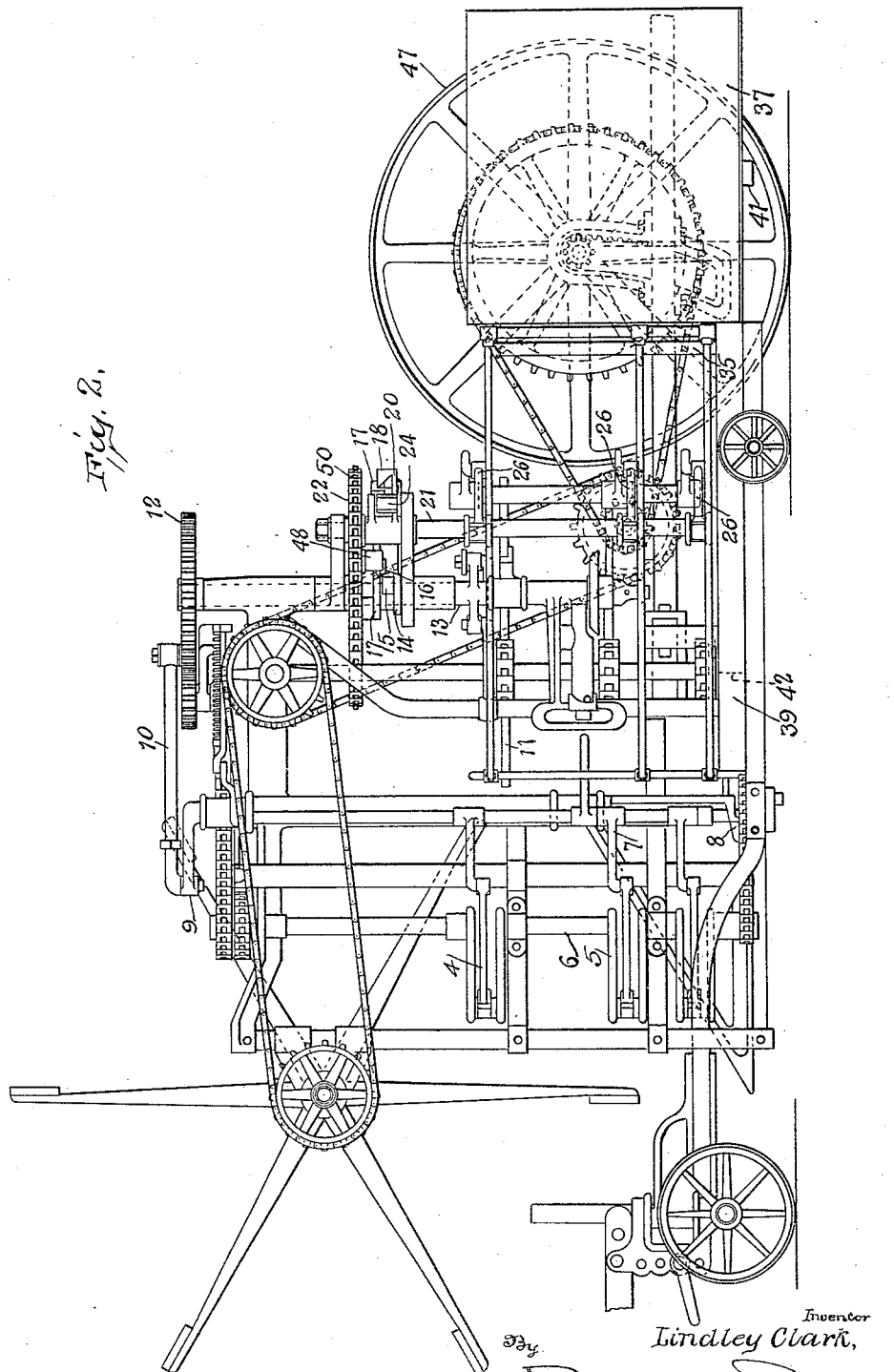

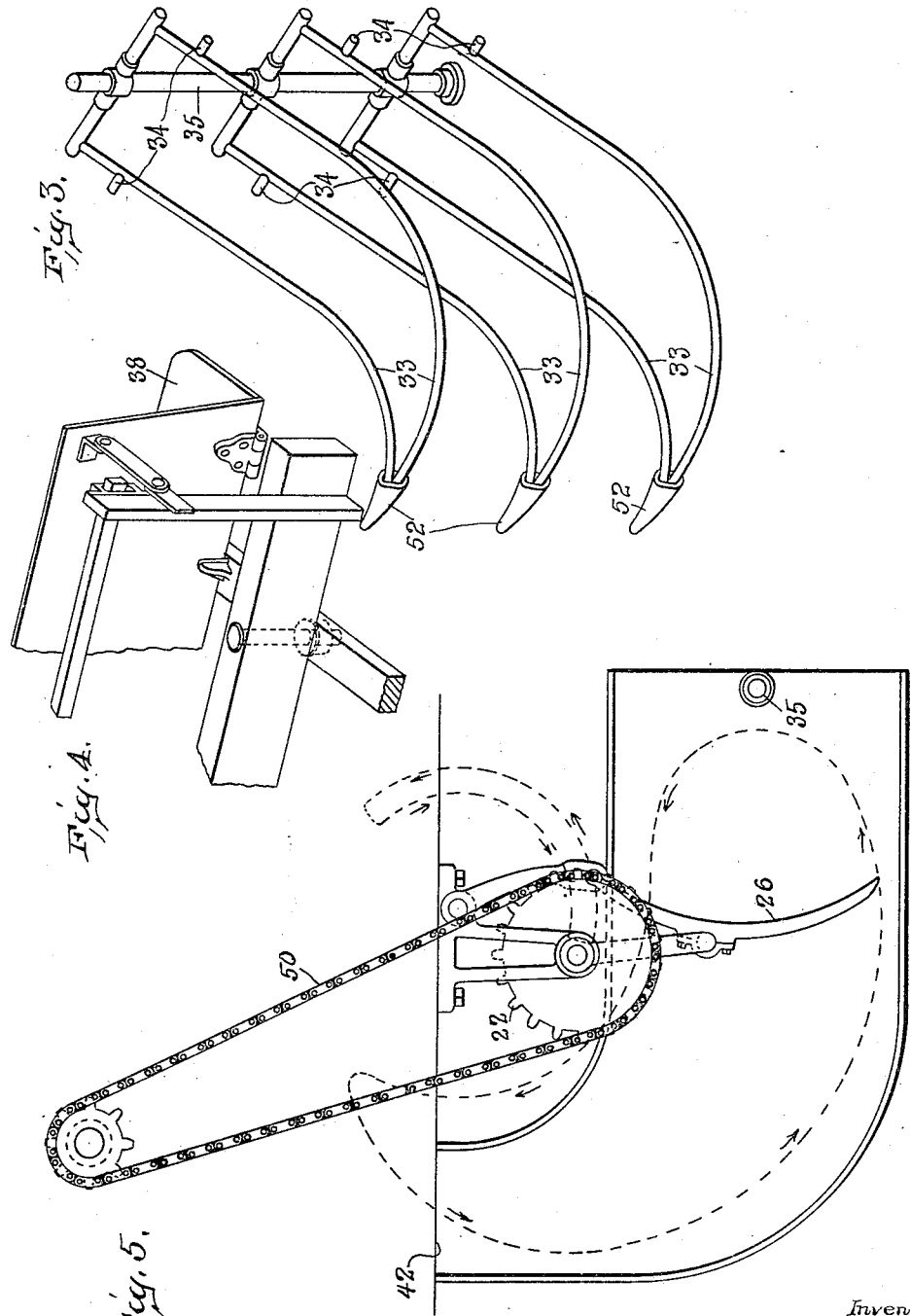

1,282,045.

Patented Oct. 22, 1918.
4 SHEETS—SHEET 4.

Inventor
Lindley Clark,
By
Attorneys

UNITED STATES PATENT OFFICE.

LINDLEY CLARK, OF XENIA, OHIO.

MACHINE FOR HARVESTING GRAIN.

1,282,045.   Specification of Letters Patent.   Patented Oct. 22, 1918.

Application filed March 19, 1917, Serial No. 155,677. Renewed July 1, 1918. Serial No. 242,937.

*To all whom it may concern:*

Be it known that I, LINDLEY CLARK, a citizen of the United States, residing at Xenia, in the county of Greene and State of Ohio, have invented certain new and useful Improvements in Machines for Harvesting Grain, of which the following is a specification, reference being had therein to the accompanying drawing.

My invention relates to machines for harvesting grain.

In my former invention in connection with grain binders, as set forth in my Patent No. 942,614, of Dec. 7th, 1909, I provided a machine which would bind the grain into bundles while in upright position as it was cut from the ground. Throughout the operation the grain was maintained in an upright position.

My present invention is an improvement, or more strictly speaking an addition, to what was claimed, described and illustrated in the aforementioned patent.

The object of my present invention is to take the bundles of grain as delivered by the machine of the former invention and assemble such bundles in an upright position in a suitable location and then deposit a predetermined number of bundles in a group on end so that this predetermined number of sheaves or bundles will constitute the ordinary shock, thus eliminating the necessity for assembling the sheaves as deposited on the ground by hand labor and putting them into a single shock. This will result in large economy in manual labor, in saving of grain through a minimum of handling and therefore a minimum of shattering, and in a saving in straw through a perfect cut at right angles to the direction of growth of the grain. This facilitates the grain standing erect and resisting the action of wind to overturn it when harvested in the field.

Figure 6:
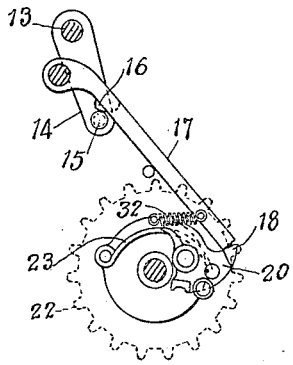
Figure 7:
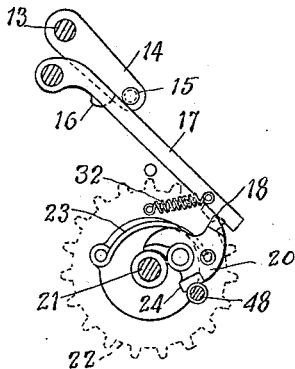
Figure 8:
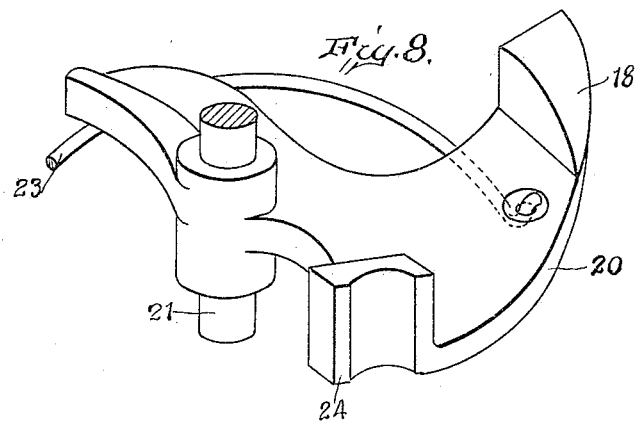
Figure 9:
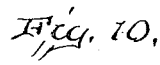
Figure 10:
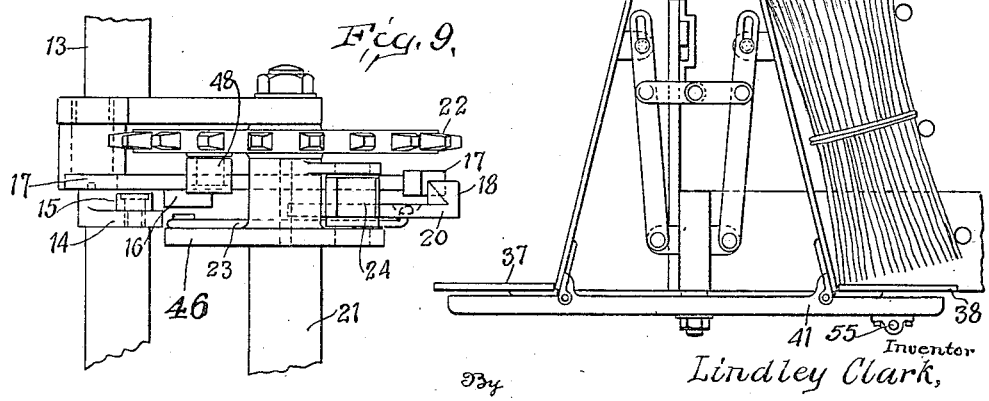

In the accompanying drawings, Figure 1 is a top plan view of the mechanism showing a portion of the cutting devices with the remainder of the mechanism complete; Fig. 2 is a side elevation of the machine looking at the machine from the side upon which the present invention is applied; Fig. 3 is a perspective from a superior point of view of the guide arms; Fig. 4 is a perspective of a portion of the dumping mechanism; Fig. 5 is a top plan view of the sweeper mechanism with the paths of travel of certain portions of the mechanism traced in dotted lines; Fig. 6 illustrates a portion of the operative mechanism for the sweeper in position just prior to the tripping of the clutch; Fig. 7 is a view of the clutch just after it has been tripped in connection with the sweeper mechanism; Fig. 8 is a perspective of the clutch much enlarged; Fig. 9 is a detail side elevation of the operative mechanism of the sweeper, the sprocket, clutch and pusher pin being shown in detail; and Fig. 10 is a rear elevation of the shock carrying and dumping platform.

Like numbers indicate like parts in the respective views.

*Fig. 1.—Top plan view.*

At the middle left hand side of Fig. 1 is the conveyer 3 which catches the grain and conveys it toward the right hand after having been cut by the cutters 1, 1, to which the grain is directed by the guides 2. The grain thus cut continues to pass to the right in the direction of the arrow, where it is engaged by the bundle forming and tying mechanism designated generally by the numerals 4, 5, 6, 7 and 8. This apparatus is more particularly described in my former patent mentioned above.

9 and 10 indicate the pitmans utilized to operate the cutter mechanism. 42 indicates the mouth of the delivery trough to which the individual bundle or sheaf of grain which has been assembled and tied passes. Upon entrance into this delivery trough to the right hand of the guiding fingers 33, 33 past the noses of those fingers 52, 52, this sheaf of grain is carried through the delivery trough along the line indicated by the arrow into the dumper 37 by means of the sweeper arm 26 which upon the moment of the entrance of the sheaf through the mouth 42 into the delivery trough 39 comes in behind the sheaf and carries it in a partial sweep of a circle along the path of the delivery trough until it is forced into the dumper 37. (The exact path which the end of the sweeper 26 traces can be readily seen in Fig. 5, where a dotted line has been used to indicate the path of the outermost extremity of the sweeper 26.) Upon the passage of this sheaf past the rear extremity of the guides 33 adjacent the dumper it comes in contact with the projections or lugs 34, 34 and accordingly draws that lug toward the rear of the machine in the direction of movement of the bundle or sheaf. In doing so it turns the fingers 33, 33 on the pivotal point 35, thus moving the noses 52, 52 and the accompanying guides 33, 33 to the opposite sides of the delivery trough so that the succeeding bundle which has in the meanwhile been gathered together and tied by the approprite mechanism will pass to the left hand side of this guiding mechanism 33, 33, being impelled along the delivery trough by the sweeper 26 which has returned to its initial position to impel it along the trough like the first sheaf or bundle was moved until the second sheaf is placed into the dumper at the rear of the delivery trough. This operation is continued successively with a sheaf, first going to the right and then to the left until six sheaves have been placed in the dumper mechanism on the right hand side and six on the left hand side. Upon the full twelve being properly located, one-half respectively on each side of the dumper mechanism, a trip lever 41 is pulled so that it coincides with the longitudinal axis of the dumper, thus allowing the dumper bottoms 37 and 38 to drop precipitantly so that they hang at a perpendicular, thus depositing the twelve sheaves of grain in one shock with the grain sheaves on end.

To explain in greater detail as to the operation of this mechanism starting from the source of power, 11 is the grain ejector utilized in the former mechanism which is fixed to the shaft 13 on which is also fixed the master gear 12. This master gear 12 carries the arm 14 upon which is located a pin 15. This pin 15 comes in engagement with the cam surface 16 on the lever 17, serving to move the lever 17 a slight distance to the left as the master gear 12 moves anticlockwise together with the arm 14. This slight movement of the arm 17 moves it from engagement with the nose 18 of the clutch 20, thus unlocking that clutch for future action. This arm 17 is normally held in engagement with the clutch 20 at its nose 18 by the spring 32.

The member 46 connected to the sprocket wheel 22 carries upon it the spring 23 which serves to keep the clutch 20 in a predetermined position. The sprocket 22 turns loosely upon the shaft 21. The sprocket 22 carries the pin 48 which is adapted to engage the lug 24 of the clutch 20 which is keyed to the shaft 21. Upon the engagement of the moving finger 48 with the lug 24 on the clutch 20 and upon the removal of the arm 17 from the path of the nose 18 of the clutch 20 the pin 48 will cause the clutch 20 to travel and thereby carry with it in the course of its revolution the shaft 21 to which is attached the sweeper and adjacent mechanism, thus causing the sweeper to move in a predetermined way to gather a bundle into the delivery trough past the guide arms and thence into the dumper.

Method of operation.

The grain is cut and delivered standing to the conveyer 3. It is thence conveyed to the packing and tying mechanism generally designated by the numerals 4, 5, 6, 7, 8, 9, 10 and 11. Upon the delivery into the trough at the mouth 42 of the completed bundle the sweeper 26 moves in behind the bundle by reason of the fact that the pin 15 has come in contact with the cam surface 16, moved the arm 17 out of engagement with the nose 18 (see Figs. 6 and 7), thus allowing the spring 23 to throw the clutch 20 outward from the shaft 21 to which it is keyed, bringing the lug 24 of the clutch 20 into the path of the moving pin 48 fixed to the sprocket 22, which sprocket is operated by the chain 50. The chain 50 derives its motion in the customary manner from the bull wheel 47. Upon the placing of this lug 24 in the path of 48, 48 picks up the clutch 20 and its attached shaft 21 and revolves the same a predetermined distance about the shaft 21 carrying with it the sweeper 26 along the line of the arrow through the delivery trough until the bundle is swept into the dumper, when the arm 26 is withdrawn along the path indicated by the dotted line in Fig. 5. The sweeper arm then comes to rest an appreciable time while waiting for a new bundle to be tied and delivered through the mouth 42 of the delivery trough. This appreciable pause is secured by having 17 return to its initial position by the spring 32 which is attached to the frame work supporting the shaft 21 so that the end of 17 will come in contact with 18 and restore it to its normal locked position from which it first started, thereby permitting the pin 48 on the sprocket 22 to pass by the lug 24 and over the body of the clutch 20 without moving 20 nor its attached shaft 21. 48 thus passes around until the pin 15 on the arm 14 again engages the cam surface 16 and throws 17 out of engagement with 18, thus permitting the clutch to fly outward again, as in the position shown in Fig. 7, ready to engage 48 as it travels in its course around 21. 22 and 48 are, of course, constantly revolving.

Thus, we have a series of packing arms 26 pressing the bundles first to one side of the delivery trough into one side of the dumper and then to the other side of the delivery trough into the other side of the dumper, these sweeper arms passing between the guiding fingers 33, 33 and pausing an appreciable time while a new bundle is being prepared for them to sweep into the dumper.

When the dumper is full the arm 41 is pulled by the wire 55 leading to the operator's seat which serves to dump the twelve bundles onto the ground in the shape of a completed shock.

While I have shown and described one embodiment of my invention it will be understood that the same has been chosen for purposes of illustration only, and that I do not desire to be limited to the details of construction shown and described, for obvious modifications will occur to a person skilled in the art.

Having thus fully described my invention, what I claim as new and desire to secure by Letters Patent, is:

1. In a grain binder, a moving means turning about a shaft, sweeper arms fixed to said shaft superimposed one above the other, a delivery trough, guiding fingers in said delivery trough between which said sweeper arms pass, and means for intermittently moving said sweeper arms to pass between said guiding fingers and through said trough, whereby bundles of grain may be moved through said delivery trough.

2. In a grain binder, a moving means turning about a shaft, sweeper arms fixed to said shaft superimposed one above the other, a delivery trough, guiding fingers in said delivery trough between which said sweeper arms pass, and means for intermittently moving said sweeper arms to pass between said guiding fingers and through said trough whereby bundles of grain may be moved through said delivery trough, and means for moving said guiding fingers from one side to the other successively as bundles of grain are passed through said delivery trough, whereby said bundles are guided alternately to the respective sides of said delivery trough.

3. In a sweeper mechanism, a source of power, means of delivering said power to a sprocket wheel, means on said sprocket wheel for engaging a clutch, a lug, one end of which is adapted to engage a locking arm, means to keep said lug in unlocked position, a locking arm, means to keep said locking arm in position to clutch said lock, means for throwing said locking arm out of engagement with said clutch, a sweeper arm affixed to a shaft to which said clutch is affixed, whereby when the sprocket and clutch in its unlocked position engage one another through the engaging means the sweeper arm will be moved in its predetermined path.

4. In a sweeper mechanism, a source of power, a chain from the source of power to a sprocket moving about a shaft, means on the sprocket for engaging a clutch affixed to said shaft, a lever attached to said shaft carrying the sweeper arm, another lever turning on a fixed point at one end and attached pivotally to one end of the sweeper arm to guide said end, means for holding the clutch normally in unclutching position, means for locking said clutch, and means for throwing out of engagement the locking mechanism of the clutch, a sprocket wheel carrying said means to throw out of engagement the locking arm driven from the same source of power first-mentioned, whereby the entire mechanism will operate in harmony and the sweeper arm will move in a predetermined path.

In testimony whereof, I affix my signature.

LINDLEY CLARK.

Copies of this patent may be obtained for five cents each, by addressing the "Commissioner of Patents, Washington, D. C."